(12) United States Patent
Knoedgen et al.

(10) Patent No.: US 7,505,064 B2
(45) Date of Patent: Mar. 17, 2009

(54) CAMERA HANDLING SYSTEM

(75) Inventors: Horst Knoedgen, Munich (DE); Dirk Huettmann, Baltmannsweiler (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 771 days.

(21) Appl. No.: 10/929,651

(22) Filed: Aug. 30, 2004

(65) Prior Publication Data

US 2006/0038883 A1 Feb. 23, 2006

(30) Foreign Application Priority Data

Aug. 17, 2004 (EP) ................... 04368055

(51) Int. Cl.
*H04N 17/00* (2006.01)
*H04N 17/02* (2006.01)
(52) U.S. Cl. ...................... 348/187; 348/345
(58) Field of Classification Search ................ 348/187, 348/188, 345, 350, 356, 357; 356/123, 124, 356/125, 127
See application file for complete search history.

(56) References Cited

U.S. PATENT DOCUMENTS

| | | | |
|---|---|---|---|
| 4,298,944 A | 11/1981 | Stoub et al. | 364/515 |
| 4,612,666 A | 9/1986 | King | 382/32 |
| 5,179,437 A | 1/1993 | Kawada et al. | 358/10 |
| 5,649,258 A | 7/1997 | Bergstresser et al. | 396/429 |
| 6,184,675 B1 | 2/2001 | Bannai | 324/158.1 |
| 6,201,600 B1 | 3/2001 | Sites et al. | 356/124 |
| 6,219,443 B1 | 4/2001 | Lawrence | 382/141 |
| 6,232,766 B1 | 5/2001 | Saouli et al. | 324/158.1 |
| 6,313,652 B1 | 11/2001 | Maeng | 324/760 |

(Continued)

FOREIGN PATENT DOCUMENTS

EP 0679932 11/1995

(Continued)

OTHER PUBLICATIONS

Co-pending U.S. Patent Appl. DS-03-008, filed Apr. 16, 2003, U.S. Appl. No. 10/417,317, Assigned to the Same Assignee, "Miniature Camera Module".

(Continued)

*Primary Examiner*—M. Lee
(74) *Attorney, Agent, or Firm*—Saile Ackerman LLC; Stephen B. Ackerman

(57) ABSTRACT

A test handler is controlled by a tester to transport, select, focus and test miniature digital camera modules. The modules are loaded onto a transport tray and moved on a conveyer to a robot. The robot selects the untested modules from the tray an alternately places the modules into two test stations. A first test station focuses and tests a first module while the second test station is loaded with a second module, thus burying the handling time for the modules within the test time. The robot returns tested modules to the transport tray, and when all modules on the tray are tested, moves the tray out of the test handler. A second tray with untested modules is positioned at the robot while the tested modules of the first tray are being focus fixed and sorted into part number bins. The overlap of operations buries handling time within the focus and test time so that the limitation of total test time is depending on focus and test operations.

49 Claims, 9 Drawing Sheets

U.S. PATENT DOCUMENTS

| | | | |
|---|---|---|---|
| 6,512,587 B1 | 1/2003 | Marcus et al. | 356/497 |
| 7,248,347 B2 * | 7/2007 | Knoedgen et al. | 356/124 |
| 7,403,229 B2 * | 7/2008 | Knoedgen et al. | 348/347 |
| 2002/0126285 A1 | 9/2002 | Gilmore et al. | 356/399 |
| 2002/0191973 A1 | 12/2002 | Hofer et al. | 396/80 |
| 2003/0002749 A1 | 1/2003 | Vehvilainen | 382/275 |
| 2003/0030648 A1 | 2/2003 | Baer | 345/589 |
| 2003/0112360 A1 | 6/2003 | Liao et al. | 348/362 |
| 2003/0142374 A1 | 7/2003 | Silverstein | 358/504 |
| 2003/0146976 A1 | 8/2003 | Liu | 348/207.1 |
| 2004/0027456 A1 | 2/2004 | Pierce | 348/175 |
| 2004/0032496 A1 | 2/2004 | Ebenstein et al. | 348/187 |
| 2004/0058487 A1 | 3/2004 | Eslmy et al. | 438/200 |

FOREIGN PATENT DOCUMENTS

| | | |
|---|---|---|
| EP | 1286553 | 2/2003 |
| EP | 1382194 A1 | 1/2004 |
| EP | 1389878 A1 | 2/2004 |
| EP | 0785439 B | 4/2004 |
| JP | 63056927 | 3/1988 |
| JP | 03099376 A | 4/1991 |
| JP | 2001292461 | 10/2001 |
| JP | 2002077955 | 3/2002 |
| JP | 2002232918 | 8/2002 |
| JP | 2002290994 | 10/2002 |
| JP | 2003035746 | 2/2003 |
| JP | 2003101823 | 4/2003 |
| JP | 2003157425 | 5/2003 |
| JP | 2003179949 | 6/2003 |
| JP | 2003219436 | 7/2003 |
| JP | 2003259126 | 9/2003 |
| JP | 2003270292 | 9/2003 |
| WO | WO 02102060 | 12/2002 |

OTHER PUBLICATIONS

Co-pending U.S. Patent Appl. DS-03-012, filed May 8, 2003, U.S. Appl. No. 10/434,743, Assigned to the Same Assignee, "Test System for Camera Modules".

Co-pending U.S. Patent Appl. DS-04-022, filed Aug. 31, 2004, U.S. Appl. No. 10/930,351, to the Same Assignee.

Co-pending U.S. Patent Appl. DS-04-024, filed Aug. 31, 2004, U.S. Appl. No. 10/930,353, to the Same Assignee.

Co-pending U.S. Patent DS-04-025, filed Aug. 30, 2004, U.S. Appl. No. 10/929,652, to the Same Assignee.

Co-pending U.S. Patent DS-04-026, filed Aug. 30, 2004, U.S. Appl. No. 10/929,300, to the Same Assignee.

Co-pending U.S. Patent Appl. DS-04-027, filed Aug. 30, 2004, U.S. Appl. No. 10/929,653, to the Same Assignee.

* cited by examiner

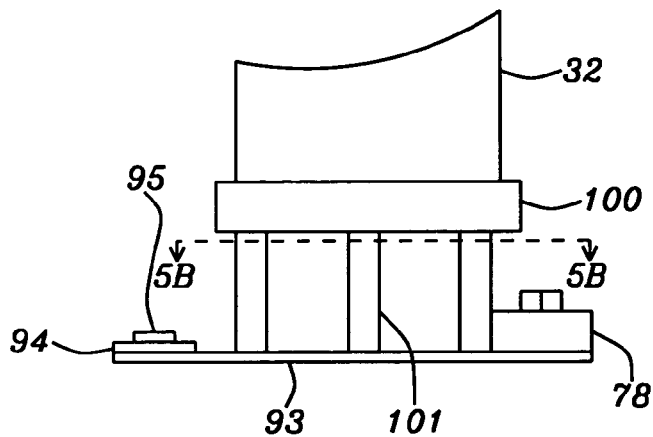
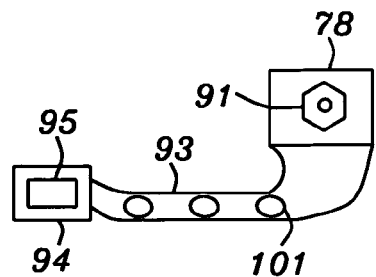
FIG. 5A    FIG. 5B
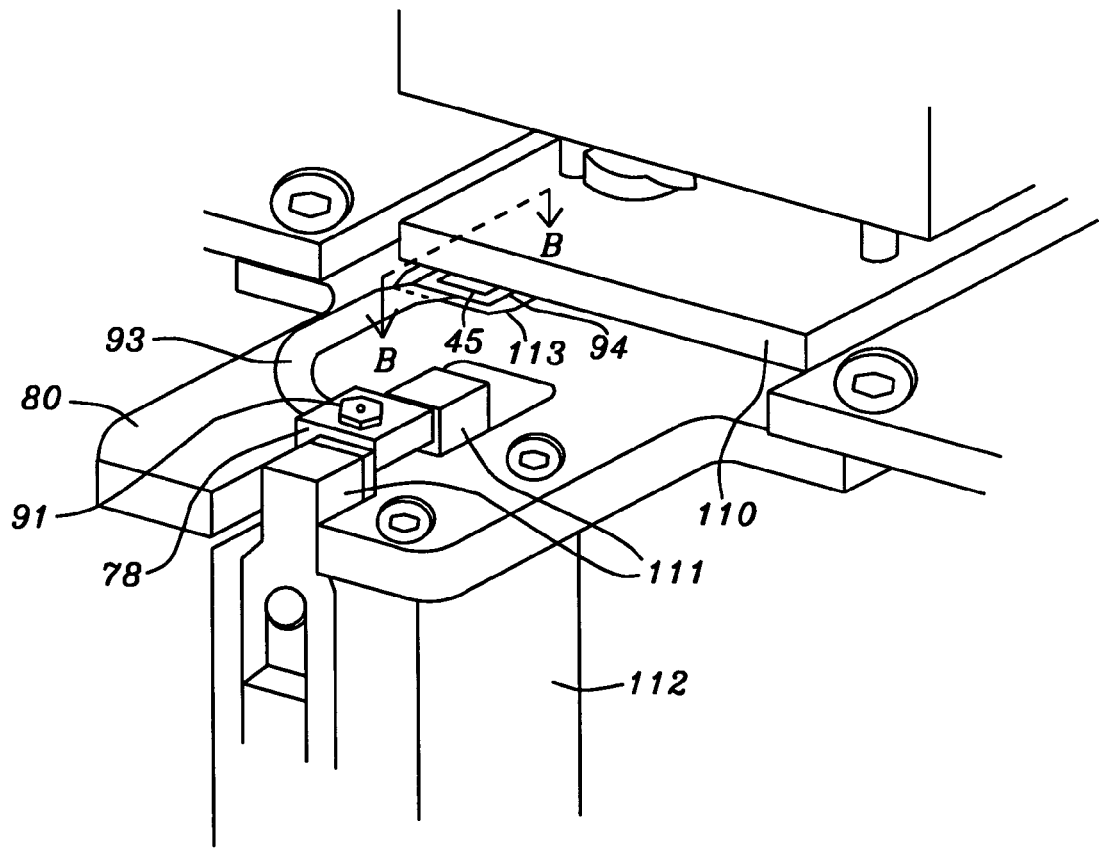
FIG. 6A

CAMERA HANDLING SYSTEM

RELATED PATENT APPLICATION

This application is related to U.S. patent application Ser. No. 10/930,351, filed on Aug. 31, 2004, and assigned to the same assignee as the present invention.

This application is related to U.S. patent application Ser. No. 10/930,353, filed on Aug. 31, 2004, and assigned to the same assignee as the present invention.

This application is related to U.S. patent application Ser. No. 10/929,652, filed on Aug. 31, 2004, and assigned to the same assignee as the present invention.

This application is related to U.S. patent application Ser. No. 10/929,300, filed on Aug. 31, 2004, and assigned to the same assignee as the present invention.

This application is related to U.S. patent application Ser. No. 10/929,653, filed on Aug. 31, 2004, and assigned to the same assignee as the present invention.

BACKGROUND OF THE INVENTION

1. Field of Invention

The present invention relates to module testing and in particular to the handling of miniature digital camera modules during focus and test operations.

2. Description of Related Art

The digital camera is becoming a ubiquitous device. Not only are digital cameras replacing the traditional film camera, digital camera devices are being used in many other applications, such as small electronic devices, such as PDA (personal data assistant) and cellular phones. With the explosion of cellular phones, the ability to take a picture and then send that picture to another individual using a second cellular phone comes the need to produce inexpensive digital camera modules and efficiently test these modules in large quantities. This is further complicated by the many different module configurations that are emerging as a result of the many different application requirements, including fixed focus, manual focus and automatic focus as well as physical size. Some of these modules are very small and others have signal leads in the form of a flex filmstrip. The testing time for digital camera module, which can have mega-pixel capability, has traditionally been a relatively long process (approximately sixty seconds for a module with 0.3 megapixels) to insure the integrity and picture quality of the camera. Quality testing at a low cost has become the utmost of importance. This necessitates a testing capability that is fast and insures the integrity and specification of the digital camera module while testing a large quantity of modules.

A patent application, Ser. No. 10/417,317 dated Apr. 16, 2003, is related to miniature cameras and their manufacturing methods that are used as built-in modules in hand held consumer electronics devices such as mobile phones and PDA's. In a second patent application, Ser. No. 10/434,743 dated May 8, 2003, a test system is described for digital camera modules used as built-in modules for consumer electronics, which performs electrical tests, adjustment of focus and sealing of the lens barrel with glue.

In addition there are a number of other prior art patents that are directed to testing of digital cameras: US 20040032496A1 (Eberstein et al.) is directed to a method of camera calibration and quality testing; EP 1389878A1 (Bednarz et al.) is directed to a method of camera calibration and testing camera quality; US 20040027456A1 (Pierce) directed to the use of calibration targets; EP 1382194A1 (Baer) is directed to dark current subtraction; JP 2003259126 (Keisuke) is directed to removing noise of an image; US 20030146976A1 (Liu) is directed to a digital camera system enabling remote monitoring; JP 2003219436 (Fuminori) is directed to adjustment of a pixel shift camera; US 2003142374 (Silverstein) is directed to calibrating output of an image output device; JP 2003179949 (Hidetoshi) is directed to a luminance level inspection apparatus; JP 2003157425 (Vehvilainen) is directed to improving image quality produced in a mobile imaging phone; JP 2003101823 (Kenichi) is directed to specifying a picture data area; EP 1286553 A2 (Baer) is directed to a method and apparatus for improving image quality; US 20030030648 (Baer) is directed to a method and apparatus for improving image quality in digital cameras; U.S. Pat. No. 6,512,587 (Marcus et al.) is directed to measurement method and apparatus of an imager assembly; US 20030002749 (Vehvilainen) is directed to a method and apparatus for improving image quality; US 20020191973 A1 (Hofer et al.) is directed to a method and apparatus for focus error reduction; WO 2002102060 A1 (Baer) is directed to a method and apparatus for smear in digital images using a frame transfer sensor; JP 2002290994 (Hidetoshi) is directed to a method and apparatus to detect foreign matter on the surface of a lens; JP 200223918 (Yanshinao) is directed to an image inspection device and method for a camera module; JP 2002077955 (Keisuke) is directed to a method and apparatus for evaluating camera characteristics; JP 2001292461 (Keisuke) is directed to a system and method for evaluating a camera; U.S. Pat. No. 6,219,443 B1 (Lawrence) is directed to a method and apparatus for inspecting a display using a low resolution camera; U.S. Pat. No. 6,201,600B1 (Sites et al.) is directed to a method and apparatus for inspection of optically transmissive objects having a lens; U.S. Pat. No. 5,649,258 (Bergstresser et al.) is directed to an apparatus and testing of a camera; EP 0679932 B1 (Kobayashi et al.) is directed to testing an electronically controlled camera; U.S. Pat. No. 5,179,437 (Kawada et al.) is directed to an apparatus for color correction of image signals of a color television camera; JP 03099376 (Hiroshi) is directed to the quality of a display screen; U.S. Pat. No. 4,612,666 (King) is directed to a pattern recognition apparatus; and U.S. Pat. No. 4,298,944 Stoub et al.) is directed to a method and apparatus for distortion correction for scintillation cameras.

SUMMARY OF THE INVENTION

It is an objective of the present invention to provide a test handler that coupled with the test routines of a tester reduces the test time by approximately an order of magnitude with respect to the prior art.

It is also an objective of the present invention to provide an apparatus and method to automatically handle miniature digital camera modules during focus and test operations.

It is further an objective of the present invention to bury the handling time of the digital camera modules within the focus and test time of the digital camera module.

It is still further an objective of the present invention test a first module in a first test station while loading a second module into a second test station.

It is also an objective of the present invention to permanently fix the focus of the digital camera module that has been focused by the apparatus of the test handler.

A test handler coupled to a tester provides a capability of positioning a tray containing a plurality of digital camera modules at a point near a robot. The modules are accurately positioned in the tray to facilitate the placement of a module under test (MUT) into a test fixture, which is allows alignment of the modules with the optics system of the handler and the electrical contactor that provides electrical signals. The robot selects a first digital camera module from the tray and positions the module in a test fixture of a first test station. The module is optically aligned with the optics system of the first test station and electrical contact is made to the I/O pins of the module. On some types of modules the I/O pins are on a flex-strip connected to the module. On other types the I/O pins are on the body of the digital camera module. Once the optical alignment and the electrical connections are made, DC tests are performed on the MUT. Then the MUT requiring manual focus adjustment is focused using focus targets and a focus unit to change the focus adjustment of the MUT. The focus adjustment is left in place during the subsequent optical testing and is permanently fixed after all digital camera modules on the tray have been focused and tested.

While a first MUT is being focused and tested in the first test station, a second MUT is chosen from the tray by the robot and aligned with the second test station. Once testing is completed on the first MUT, focus and testing is started on the second MUT. The first MUT is returned to the tray, and a third MUT is placed into the first test station. This alternate use of the two test stations allows the handling time to be buried under the focus and test time.

After test is complete on all digital camera module contained on first tray. The first tray is moved to a lens fixing and part number binning area. A second tray is then moved to the alignment mark for selection by the robot of the digital camera modules contained therein for electrical and optical tests. The lens on digital camera modules of the first tray, which have been manually adjusted in a test station, are permanently fixed in place using glue or other techniques such as laser welding of the lens cap to the module body or physically pinning the cap to the module body. After the lens of all the digital camera modules in the first tray has been permanently fixed, the modules in the first tray are sorted into part number bins (called binning). While the modules contained on the second tray are being tested, a third tray is being loaded with additional module to be moved to the alignment mark at the robot when the second tray is moved to the lens fixing and binning areas. Thus the loading operation of the third tray and unloading operation (focus fixing and binning) of the first tray are buried within the focus and test time of modules on the second tray.

BRIEF DESCRIPTION OF THE DRAWINGS

This invention will be described with reference to the accompanying drawings, wherein:

FIGS. 5A and 5B are diagrams of the vacuum pick up unit of a robot used to select a module from a tray and position the module in a test fixture of the present invention, FIG. 6A is a diagram of a MUT clamped in place on a test fixture of a test station of the present invention.

DETAILED DESCRIPTION OF THE PREFERRED EMBODIMENT

Figure 1:
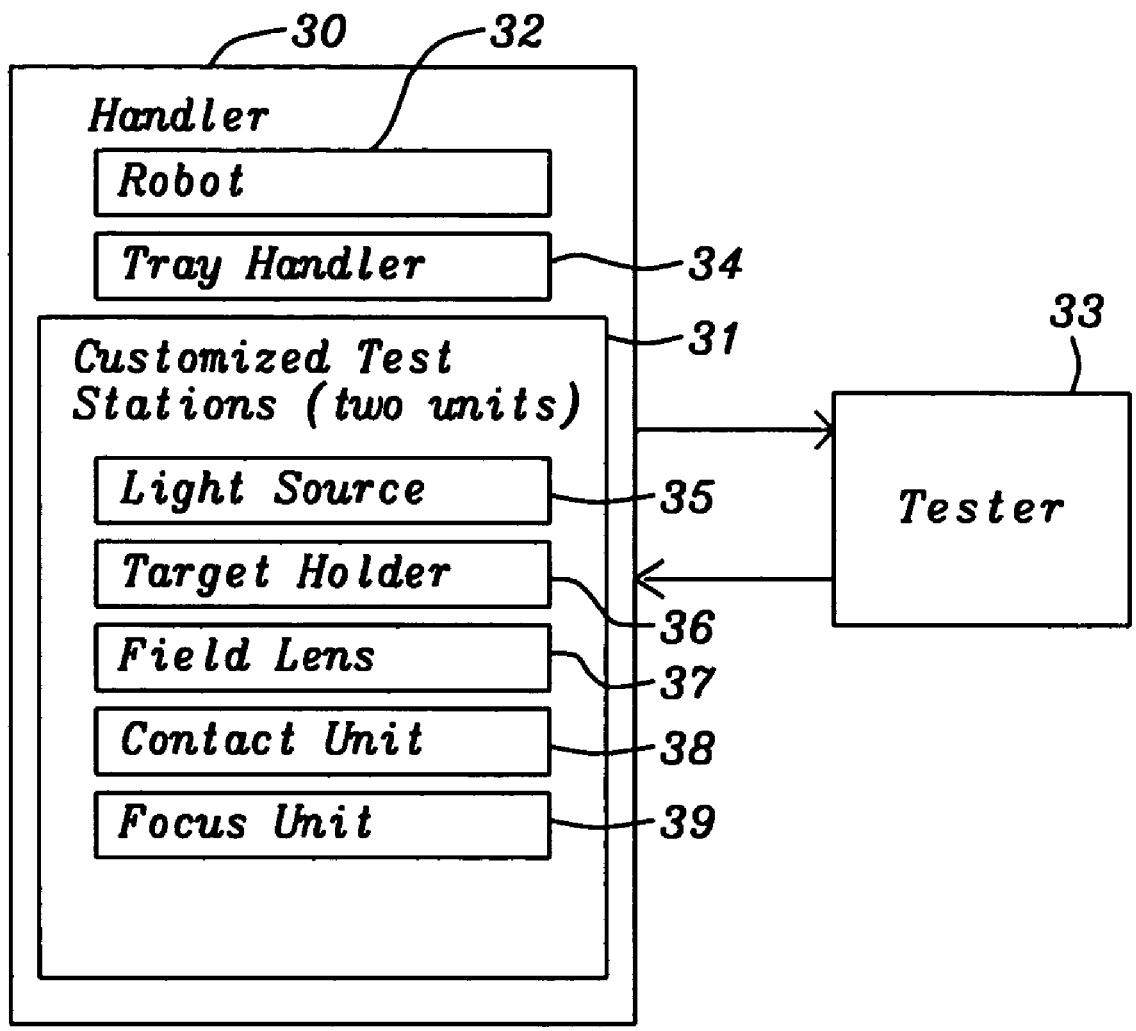
FIG. 1 is a diagram of the present invention showing a test handler coupled to a tester.

FIG. 1 shows basic concept of a digital camera module test system of the present invention in which a tester 33 controls the operation of a handler 30 and receives back from the handler tested modules and data result from the tests corresponding to the tested modules. The handler 30 contains two customized test stations 31 that are electrically coupled to the tester 33. The test stations are customized to accommodate the shape and electrical leads of a particular digital camera module. Each test station 31 can be configured to test the same type or different types of digital camera modules depending upon the requirements of the manufacturing test line.

A tray handler 34 is used to transport a metal tray, which contains a plurality of miniature digital camera modules, which are accurately positioned on the tray, through the handler. The tray of digital camera modules is position at an alignment mark so that a robot 32 can remove a digital camera module from the tray and place the module into either of the two test stations 31. A digital camera module is placed into the test fixture using a vacuum unit attached to the robot 32, and the digital camera module is optically aligned in the test station. The optics system of the test station includes a light source 35 containing a minimum of four different colors (red, blue, green and infrared), target holders 36 used to hold targets that are used for testing and or adjusting the focus of the digital camera module under test (MUT) and a field lens 37. The field lens produces a virtual focus distance from the MUT of the focus targets contained in the target wheels 36, which makes the targets used in focus testing of the MUT to appear to be more distant from MUT than the physical distance between the MUT and the targets. A contact unit 38 connects to the electrical contacts of the MUT to allow the tester to apply electrical signals and obtain test data including test pictures. The focus unit 38 is used to adjust the focus of a MUT having a manual focus capability by physically adjusting the lens cap 20 on the MUT. In a MUT with and automatic adjustable focus, an electrical signal applied to the MUT is used to adjust the focus over the focus range of the MUT.

Figure 2:
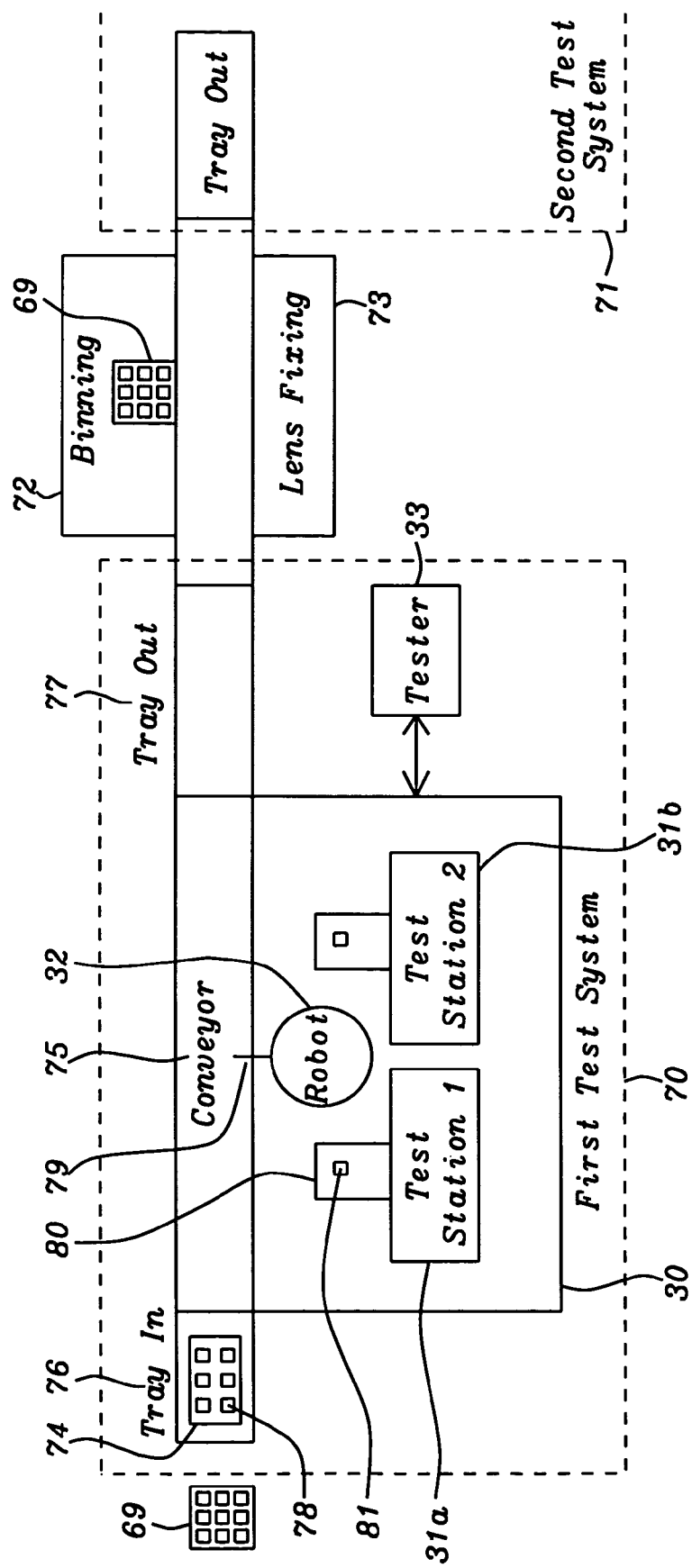
FIG. 2 is a floor plan of the handler of the present invention.

FIG. 2 is a diagram of the present invention showing a floor plan of the handler 30 located within a first test system 70 and connected to a tester 33. A location of second test system 71 is shown connected to the binning 72 and lens fixing 73 areas used by the first test system. A carrying tray 69 is used to carry untested modules to the handler 30 and is unloaded into a metal tray 74 for transport of digital camera modules 78 through the handler. The carrying tray 69 can be of any suitable material for carrying modules to and from the handler, but is not of a design or material with sufficient dimensional accuracy to be used with in the handler. The metal tray 74 is designed for dimensional stability and accurate alignment of the modules 78 to accommodate the ability of the robot 32 to select a module and orient the module in a test fixture 80. Other material than metal is within the scope of the present invention to be used in place of the metal tray 74, but the non-metal material must be able to accommodate the tolerances required by the handler. The metal tray 74 contains a plurality of digital camera modules 78 that are accurately positioned on the metal tray. The metal tray 74 is placed on a transport mechanism of the conveyer 75 at a "tray in" location 76 and is moved to an alignment location 79 near the robot 32. The digital camera modules contained within the tray 74 are placed in designated locations 78, which are accurately aligned on then tray 74, and oriented such that the robot 32 can select a digital camera module from the tray and place the module into a location 81 in a test fixture 80 of a test station 31a and 31b.

Continuing to refer to FIG. 2, the handler 30 has two test stations 31a and 31b and the robot 32 selects an untested digital camera module 78 from the tray 74 positioned at the alignment mark 79, and places a first module into the test fixture 80 of one of the test station 31a, which is not being used to perform test, while testing is being performed on a second digital camera module in the other test station 31b. This allows the time for handling of the modules to be buried within the focus and test time of the modules. The digital camera module placed onto the test fixture 80 is optically aligned and clamped in place on the test fixture. The first digital module in a first test fixture 80 is aligned with the optics contained in the test station, and waits completion of testing of a second digital camera module in the second test station before commencing the focus and testing procedures.

Upon completion of tests on all of the digital camera modules 78 contained within a tray 74, the tray is moved to the "tray out" area 77 where the manually adjustable lens on modules that have passed the test criteria are physically fixed into place in the lens fixing area 73, comprising the use of glue or other methods of physically fixing the lens focus in place, such as the use of a laser to weld the lens cap to the body of the module or pinning the lens cap to the module body. The modules are then sorted into pass or fail, including different categories of pass in the binning area 72 and placed back into plastic trays 69 to be transported from the test system. If the digital camera modules contained on the tray have a fixed focus or have a variable focus that is focused by an electrical signal, the modules bypass the lens fixing and are sorted according to the test results in the binning area 72 and placed into plastic trays 69.

Figure 3:
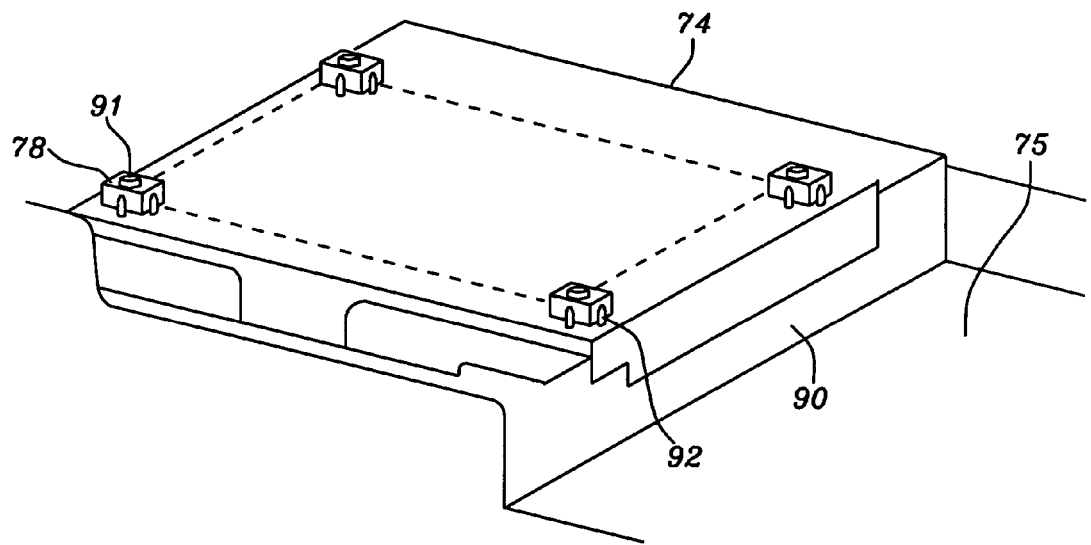
FIG. 3 is a diagram of the handling tray containing digital camera modules of the present invention and resting on a platform for conveying the tray through the test handler.

Referring to FIG. 3, a metal tray 74 is shown that is aligned to and is resting on a transport platform 90. The transport platform 90 is aligned to and resting on the conveyor apparatus 75 of the handler 30. A plurality of digital camera modules 78 is shown positioned on the top surface of the metal tray 74. Alignment pins 92 are used to maintain the alignment of the digital camera modules 78. An adjustable lens cap 91 is shown protruding above the body of the modules 78. Not shown in FIG. 3 are the flex-leads attached to the digital camera modules and the associated alignment pins.

Figure 4:
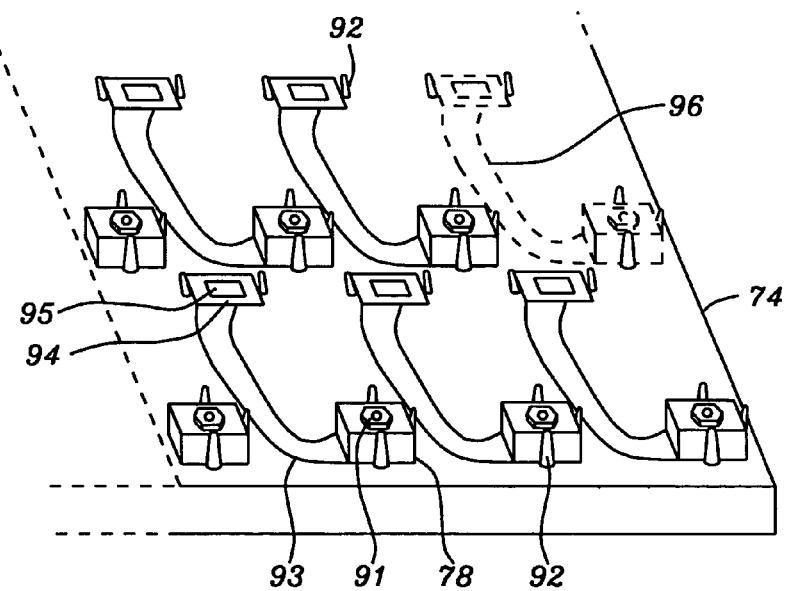
FIG. 4 is a diagram of a portion of a tray of digital camera modules of the present invention with the flex-leads positioned on the tray.

In FIG. 4 is shown a portion of a metal tray 78 containing a plurality of digital camera modules 78 with lens caps 91 and a flex-lead 93 connecting to a connector PCB (printed circuit board) 94 that contains a connector 95. Alignment posts 92 are shown, which maintain the alignment of the module body 78 and the connector PCB 94 to the tray 74. The alignment of the digital camera modules on the tray is critical for a robot to select the modules and accurately place them into a test fixture. The test handler 30 scans for missing modules 96 to prevent the robot from trying to select a module that does not exist and to provide to a test map of the modules on the tray 74 and identification of any missing product.

In FIG. 5A is shown a vacuum unit 100 connected to the robot 32. The robot uses the vacuum unit to pick up from a metal tray 74 a digital camera module comprising the module 78, flex-lead strip 93, connector PCB 94 and connector 95, and place the digital camera module into a test fixture. A plurality of vacuum tubes 101 makes contact along the length of the flex lead strip 93 of the digital camera module. The robot translates the orientation of the digital camera module on a metal tray 74 into an aligned orientation in a test fixture 80. The number of vacuum tubes depends on the length of the flex-leads and the requirement to maintain the digital camera module in a position that can be automatically placed into the test fixture 80. The alignment in the tray 74 is critical to the ability of the robot 32 to position the module 78 into the test fixture 80, which will allow alignment with the optics system of a station 31a or 31b and to make an electrical contact to the connector 95. After testing is completed, the robot using the vacuum unit 100 lifts the digital camera module from the test fixture and moves the digital camera module back to the metal tray 74. The module 78, flex-leads 93 and the connector PCB 94 are re-orientated in the original location and position on the tray 74.

FIG. 5B shows a view of the contact of the vacuum tubes 101 to the flex-lead strip 93. The lens cap 91 is shown as an hexagonal shape that facilitates contact to the focus unit of the test station. Other shapes such as cylindrical, oval and rectangular can be used and require a focus unit that can grasp the lens cap and make accurate adjustments to the focus of the module 78.

Figure 6B:
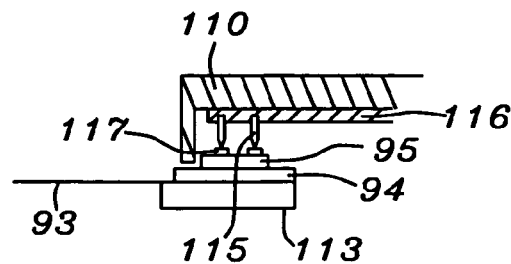
FIG. 6B is a diagram of the electrical contact made between the test station and the flex-leads of the MUT of the present invention.

In FIG. 6A is an isometric view of a digital camera module MUT 78 and its flex-strip leads 93 positioned on a platform of test fixture 80. Appearing from under a probe holder 110 is the PCB 94 that is attaches the leads of the flex-strip 93 to the electrical connector 95. The PCB is resting on a pad 113, which insulates the PCB 94 and flex strip 93 from the test fixture platform 80 and provides a cushion to the PCB when the electrical connector 45 is being contacted by the probes 115 (shown in FIG. 6B). A pair of clamps 111 actuated by an electrically operated clamp actuator 112 hold the MUT 78 in position by pressing on opposite sides of the MUT. The probe holder 110 makes electrical connection to all the leads of the connector 95 with probes connected to pin electronics so that the MUT 78 can be controlled and tests can be performed.

FIG. 6B shows a cross section view of the probe holder 110 over the area of the PCB 94. A probe board 116 contains electrical probes 115 that are put in contact with the electrical contacts 117 of the connector 95 of the PCB 94 connected to the flex-strip 93. All electrical contacts 117 are connected to a separate probe 115 and the resulting connection is electrically connected to the pin electronics of the tester. The pad 113 provides a cushion to forces applied to the PCB 94 by the probe holder and insulates the PCB from the surface of the test fixture 80

Figure 7:
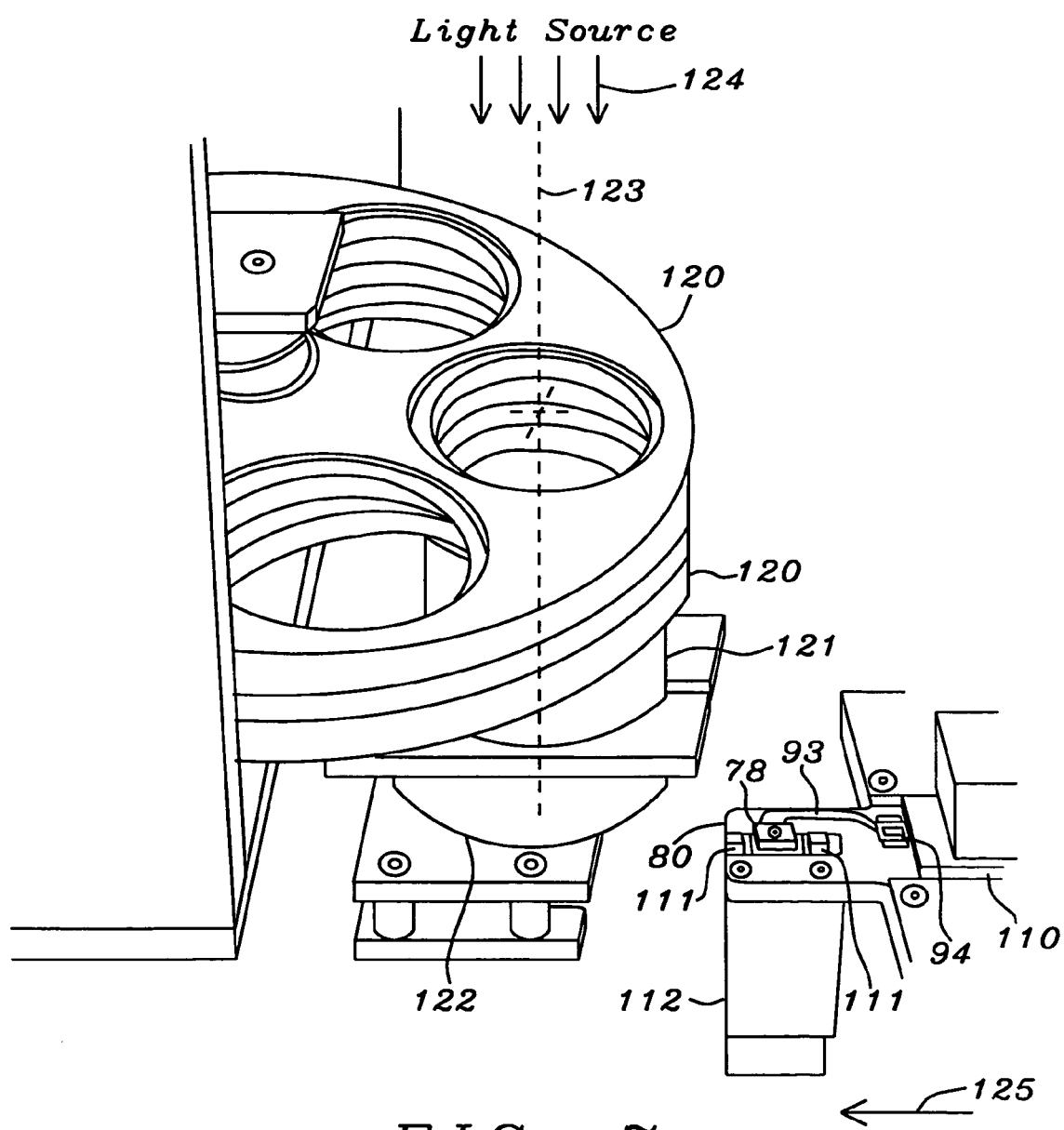
FIG. 7 is a diagram of a portion of the optics system of a test station of the present invention and a MUT in the test fixture that has finished test.

FIG. 7 is an isometric view of a portion of a test station 31 showing target wheels 120, the outer casing of a field lens 121, the outer casing of a focus unit 122 the optical reference line 123 and light from the light source 124. The optical reference line 123 is an imaginary line running from the light source 124 through the center of an aperture of the target wheels 120, the center of the field lens 121 and the center of the focus unit 122. The light source uses LED's (light emitting diodes) of different colors, comprising red, blue, green and infrared.

Continuing to refer to FIG. 7, the test fixture 80 is shown with the MUT 78, the flex-lead 93 and the PCB 94 in an unclamped position and pulled back from the optical system comprising the target wheels 120, field lens 121, focus unit 122 and light source 124. The module clamps 111 controlled by the clamp actuator 112 are open, and the probe holder 110 is also pulled back from contact with the connector 95 on the PCB 94. In this position the MUT 78 can be lifted out of the test fixture 80 by the vacuum unit 100 attached to the robot 32. When the MUT 78 and its connector 95 (FIG. 6B) are clamped into position, the test fixture 80 is then positioned 125 to locate the lens of the MUT 78 under the optical reference line 123. The focus unit 122 is brought into physical contact with the lens cap 91 (FIG. 6A) of the MUT 78, and a stepper motor in the focus unit 122 adjusts the focus of the MUT 78.

Figure 8A:
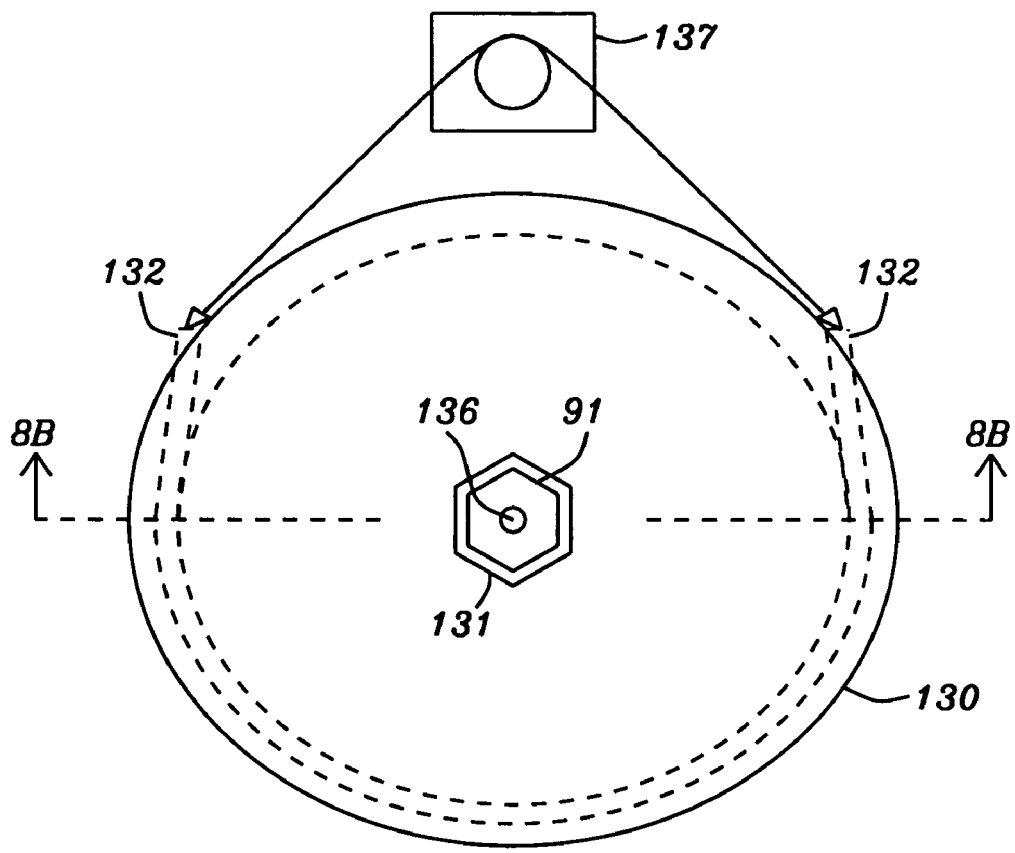
FIGS. 8A and 8B are diagrams of the present invention of the focus apparatus in contact with the MUT.

In FIG. 8A is shown a top view of a focus apparatus 130. At the center is a lens cap 91 of a digital camera module that is focused by turning the lens cap. The lens cap 91 is surrounded by an access hole 131 in the focus apparatus, which has a shape that matches the shape of the lens cap 91. In the center of the lens cap is a light hole 136 that allows light to fall onto a lens 133 and subsequently on a light sensitive device 134 within the digital camera module 78 through a lens 133, shown in FIG. 8B. In the view shown in FIG. 8A, the lens cap 91 and the access hole 131 in the focus apparatus 130 have a hexagonal shape where the access hole 131 of the focus apparatus 130 is slightly larger than the lens cap 91. Other shapes are can be used for the lens cap 91 with the requirement that the focus apparatus 130 have an access hole shape or an equivalent mechanism to physically adapt to the lens cap 91 for purpose of turning the lens during a focus operation. A belt 132 or equivalent mechanism connects the focus element 130 to a stepper motor 137 to allow the adjustment of the focus of the MUT 78 by turning the focus element in both directions.

Figure 8B:
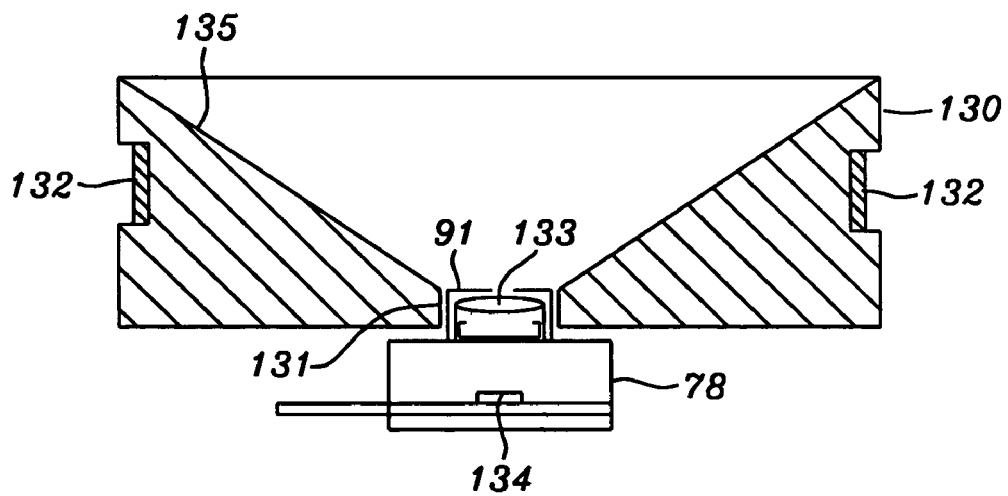

FIG. 8B shows a cross section of the focus element 130 and the MUT 78. The lens focus apparatus access hole 131 is shown around sides of the lens cap 91. A photosensitive semiconductor device 134 is centered within the MUT 78 under the optical axis of the lens 133. The lens cap 91 is turned by the focus element 130 using the belt 132 connected to a stepper motor until light of an image being viewed by the digital camera module is in focus on the photosensitive device 134. The inner shape 135 of the focus apparatus 130 is angled so as to not inhibit light emanating from a focus target from falling on the lens 133.

Figure 9:
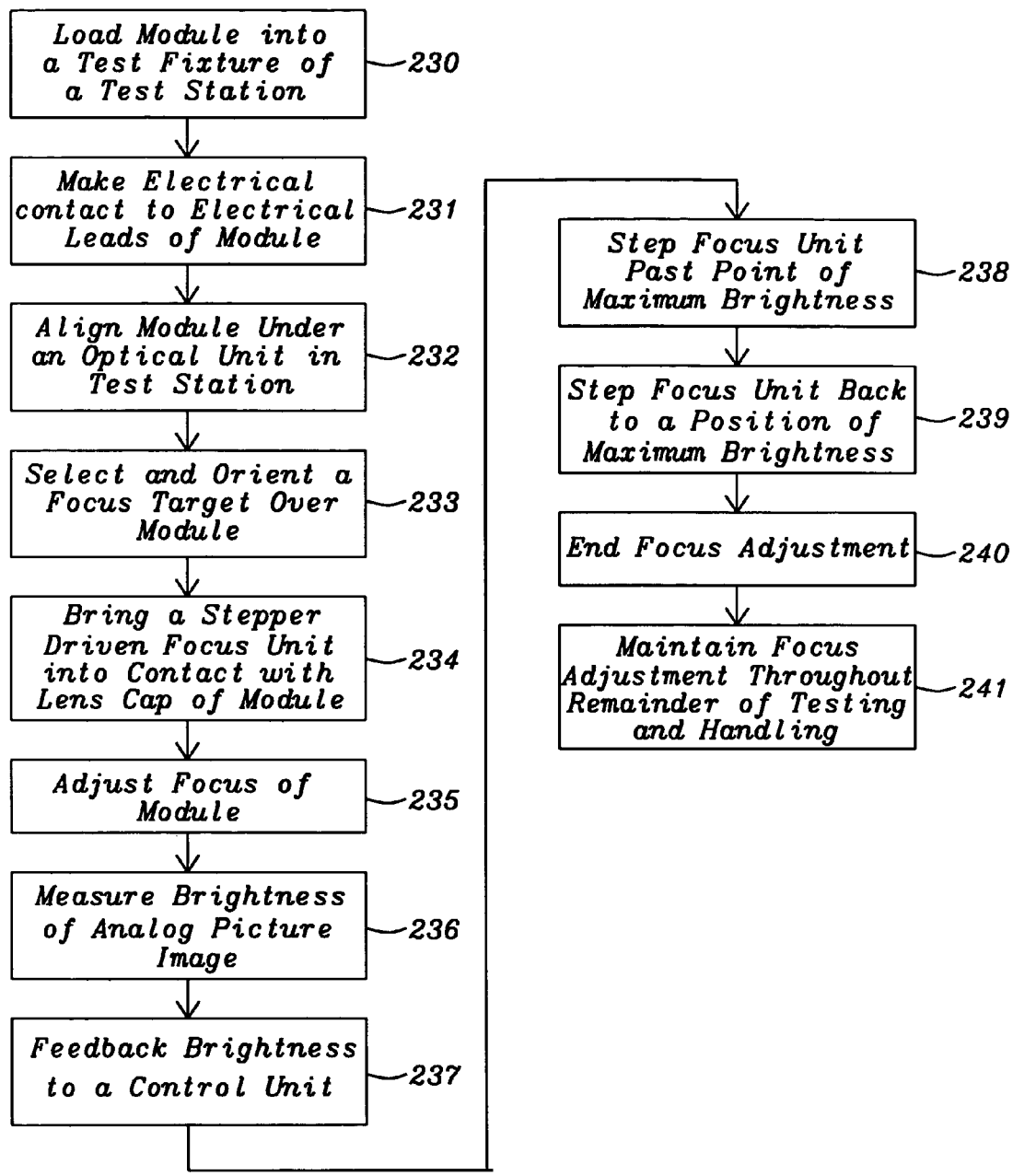
FIG. 9 is a flow diagram of the method of focus adjustment to a MUT positioned in a test fixture.

In FIG. 9 is shown a flow diagram of the method of adjusting the focus of a digital camera module. A module is loaded into a test fixture of a test station of the handler 230. Electrical contact is made to the module electrical leads 231, which allows the module to be powered and to receive and send electrical signals. The module lens is aligned under the optical unit of the test station 232. A target within the optical unit is selected and positioned over the digital camera module 233. The positioning of the target over the digital camera module includes the optical distance of the target from the module. A stepper motor driven focus unit is brought in contact with the lens cap of a module with a manually adjustable lens 234.

Continuing to refer to FIG. 9, the shape of the lens cap dictates the shape of the portion of the focus unit that is in contact with the lens cap. The preferred shape is hexagonal for ease of mating of the lens cap and the focus unit and at the same time allowing accurate adjustment of the lens cap. However other lens cap shapes can be used which will require changes to the part of the focus unit that contacts the lens cap of the module. Other shapes include round, round with a flat, square and octagonal. The stepper driven focus unit adjusts the focus of the digital camera module by stepping in fine increments past a point of maximum image brightness of the module 235. If a digital camera module with a fixed focus is tested, the focus unit is not used, and the fixed focus is tested to determine if the fixed focus module meets specifications. If a module with an electrically variable focus is tested, the test system controls the focus with electrical signals, checking that the electrically variable focus meets specification over the focus range of the module.

Continuing to refer to FIG. 9, an analog picture image is measured for picture brightness 236. The brightness of the picture image is fed back to a control unit 237, which controls the stepper motor. The stepper motor turns the part of the focus unit in contact with the module cap in increments until the point of maximum brightness is passed 238. Then the stepper motor is control to reverse direction with small step increments and stopping at the closest stepper motor step to the point where maximum brightness occurred 239. The focus adjustment is ended 240 and the focus adjustment 239 is maintained throughout the remainder on the testing and handling within the test handler 241.

Figure 10:
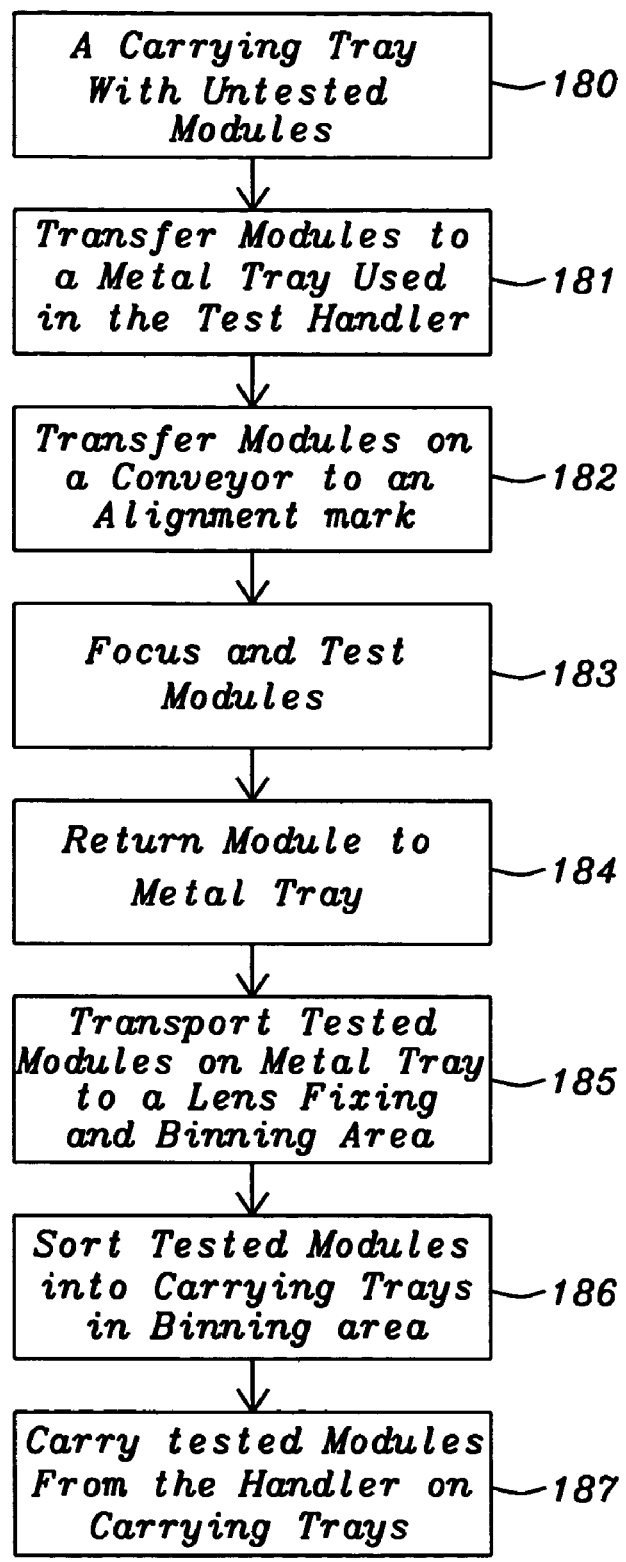
FIG. 10 is a flow diagram of the method of transporting digital camera modules.

In FIG. 10 is a flow diagram for transporting digital camera modules. A carrying tray with digital camera modules for test is brought to the handler 180. The carrying tray can be of any material, such as plastic, but it is not dimensionally accurate and does not hold the camera module with sufficient accuracy to be used in the test handler. The carrying tray can be any size and is not required to contain the same number of modules as a metal tray used to transport untested modules through the handler. The digital camera modules on the carrying tray are transferred to the metal tray 181. The modules placed onto the metal tray in an accurate orientation to allow selection by a robot at a test station. The metal tray with untested digital camera modules is transported on a conveyor to an alignment mark 182. The alignment mark is near a robot used to select modules for focus and test from the tray by the robot. The digital camera modules are focused and tested 183 and returned to the metal tray by the robot oriented in the original position 184. The tested modules are transported by the conveyor of the handler on the metal tray to a lens fixing and module binning area 185. After the lens cap of the module has been permanently fixed to the body of the module, the tested digital camera modules are sorted into bins comprising carrying trays 186. The carrying trays are then used to carry the tested modules from the test handler 187.

Figure 11:
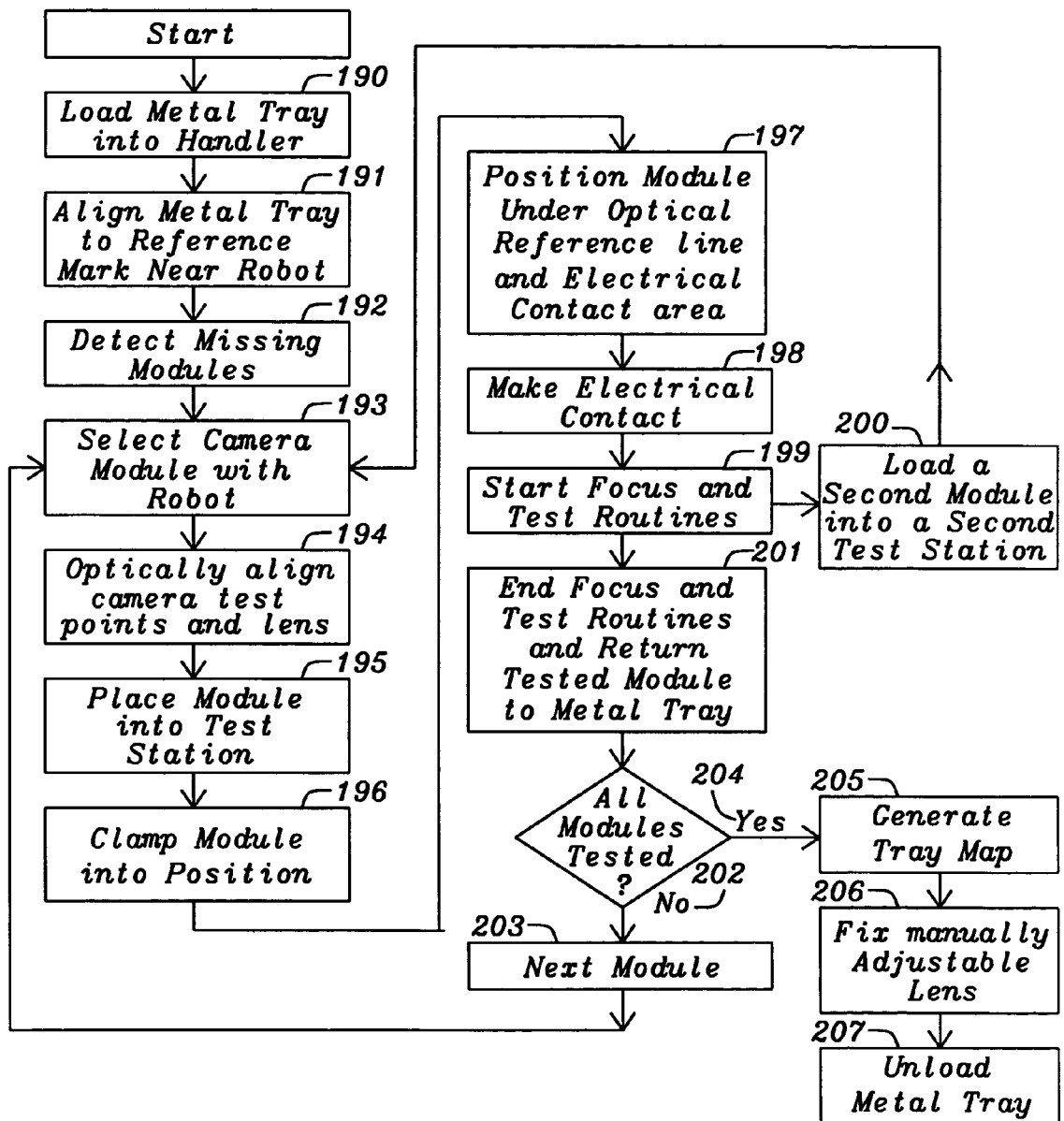
FIG. 11 is a flow diagram of the method of the handling of digital camera modules within the test handler.

In FIG. 11 is a flow diagram of the method of the handling of digital camera modules within the test handler 30 of the present invention. A metal tray containing a plurality of digital camera modules is loaded into the handler 190. The tray is of metal construction to meet the tolerance requirements of the handler, whereby the digital camera modules are accurately located on the metal tray with alignment posts that maintain alignment throughout the operations of the handler. Material other than metal can be used in place of the metal tray; however, the non-metallic material must meet stringent tolerances and accurately position the digital camera modules so the modules can be selected by the robot and accurately oriented in a test fixture. The metal tray normally contains digital camera modules of the same part number, but it is within the scope of the present invention that the tray contain can contain a plurality of part numbers. This may require one part number to be tested in one test station and another part number tested in another test station. The metal tray is aligned with a reference mark 191 located near a robot. The robot is used to select a digital camera module from the tray, orient and place the module into a test station. Modules missing from the tray are detected 192 and the robot selects a digital camera module 193.

Continuing to refer to FIG. 11, the lens and I/O test points of the selected digital camera module are optically aligned 194. The digital camera module is then placed into a test fixture of a first test station 195 and clamped into position 196. The digital camera module is positioned under an optical reference line and the electrical contact area of the test station 197. Electrical contact is made to the I/O leads of the modules 198 using an electrical contactor probe having a plurality of electrical contacts, and then focus and test routines are started 199. Electrical contact is made to all I/O leads of the module. Electrical tests comprise of DC tests for continuity, current, functionality and module temperature. Photonic testing of the photo sensitive device within the digital camera module comprises color sensitivity and leakage, dark current, bad pixels, noise, and distortion. A second module is loaded into a second test station 200 using the robot to select the next digital camera module from the metal tray 193, after which the second module is optically aligned 194 and placed into a test fixture of the second test station 195. The pre-test operations continue on the second digital camera module while the first digital camera module is being focused and tested. This buries the time to handle the second module within the test time of the first module.

Continuing to refer to FIG. 11, when the test on the first digital camera module ends 201, the first digital camera module is place back into the metal tray by the robot in its original location in the tray, and the focus and test routines are started on the second module 199. If all the modules in the tray are not tested 202, a third module is selected by the robot 203 and 193 to go through the placement and alignment operations 193, 194, 195, 196, 197 and 198 in the test fixture of a test station not being used for test operations while the second digital camera module is finishing the focus and testing operations.

Continuing to refer to FIG. 11, if all the modules in a tray have been tested 204 and returned to the metal tray, the tray is moved from the test stations and a next tray is positioned at the alignment mark to begin the next series of focus and tests. A tray map is generated identifying test results for each module 205 so that the tray can be unloaded 207 and the modules placed in the appropriate part number bins for the tested module. Before the tray is unloaded into bins, manual focus modules with a focus adjusted during test are processed through the lens-fixing step 206. Lens fixing comprises gluing the lens cap to the body of the digital camera module. Other lens fixing techniques can be used such as using a laser to weld the lens cap to the body of the module or by a mechanical method such as using a pin to prevent the lens cap from turning and destroying the focus.

While the invention has been particularly shown and described with reference to preferred embodiments thereof, it will be understood by those skilled in the art that various changes in form and details may be made without departing from the spirit and scope of the invention.

What is claimed is:

1. A method of loading and testing miniature digital camera modules, comprising:
   a) loading a tray with a plurality of digital camera modules,
   b) positioning said tray at a plurality of test stations,
   c) overlapping a loading of said plurality of the modules onto said test stations for a focus and test of said plurality of modules,
   d) moving said tray containing tested modules to a focus fixing area,
   e) positioning a next tray at said plurality of test stations and repeating steps c and d for said second tray,
   f) generating a test map of said tested modules,
   g) fixing said focus of said tested modules,
   h) sorting said tested modules into part number bins.

2. The method of claim 1, wherein said tray is a metal tray.

3. The method of claim 1, wherein said focus is maintained throughout subsequent testing and handling.

4. The method of claim 1, wherein said test further comprises:
   a) DC tests,
   b) photonic testing of the light sensitive device contained within said modules.

5. The method of claim 1, wherein said tray further comprises:
   a) said plurality of digital camera modules oriented and positioned for selection by a robot,
   b) each module of said plurality of modules located with alignment pins mounted on said tray.

6. The method of claim 5, wherein said alignment pins on said tray position a body of said modules and a PCB (printed circuit board) of an electrical connector of said modules.

7. The method of claim 1, wherein the positioning of said tray further comprises:
   a) placing said tray on a conveyor apparatus,
   b) moving said tray with said conveyor,
   c) locating said tray at an alignment mark near said plurality of test stations.

8. The method of claim 1, wherein the plurality of test stations is one.

9. The method of claim 1, wherein the plurality of test stations is two.

10. The method of claim 9, wherein said overlapping of the loading with the focus and testing of said plurality of modules further comprises:
    a) loading a first test station with a first module of said plurality of digital camera modules,
    b) starting focus and test routines on said first module, then
    c) loading a second test station with a second module of said plurality of digital camera modules, then
    d) ending said focus and test routines on said first module, then
    e) starting focus and test routines on said second module and loading a third module of said plurality of digital camera modules into the first test station, then
    f) repeating said overlap of loading with focus and testing until said plurality of digital camera modules is tested.

11. The method of claim 10, wherein said loading further comprises:
    a) selecting said plurality of modules with a robot,
    b) orienting said modules into a test fixture in said first and second test stations,
    c) clamping said modules into said test fixture,
    d) positioning said modules under an optical reference line and electrical contacts,
    e) making electrical contact to electrical leads of said modules,
    f) unloading said test fixture with said robot after completion of focus and test routines.

12. The method of claim 11, wherein selecting said plurality of modules with said robot uses a vacuum unit to contact a flex-strip containing electrical leads of said modules to select said modules and to lift the modules from the tray and place the modules into said test fixture of said test stations.

13. The method of claim 12, wherein said vacuum unit contains a plurality of tubes that are used to apply a vacuum simultaneously to said flex-strip to lift the module from said tray.

14. The method of claim 11, wherein unloading said test fixture with said robot uses a vacuum unit to contact a flex-strip containing electrical leads of said modules in said test fixture to lift the modules from the test fixture and place the modules back onto said tray.

15. The method of claim 14, wherein said vacuum unit contains a plurality of tubes that are used to apply a vacuum simultaneously to said flex-strip to lift the module from said test stations.

16. The method of claim 14, wherein said robot unloads said test fixture by placing said modules onto the tray in an orientation and position from which the modules were originally selected.

17. The method of claim 11, wherein said clamping uses a clamp actuator which positions clamping elements in firm contact with two opposite sides of a body of said modules.

18. The method of claim 11, wherein said electrical contact is made to said electrical leads of said modules by a set of probes.

19. The method of claim 18, wherein said set of probes makes contact with a connector located on a PCB (printed circuit board) connected to said electrical leads.

20. The method of claim 1, wherein said fixing of the focus of tested modules uses glue to permanently bond a lens cap to a body of said modules with a manual focus.

21. The method of claim 20, wherein said fixing of the focus of tested modules uses a laser to weld said lens cap to said body of the modules.

22. The method of claim 20, wherein said fixing of the focus of tested modules uses a pin to physically fix said lens cap to said body.

23. The method of claim 1, wherein said sorting of the tested modules uses said test map to determine which module is placed into said part number bins.

24. The method of claim 23, wherein said part number bins include bins for containing said tested modules with a test result that are a variation of a test specification.

25. A method for handling and testing miniature digital camera modules, comprising:
   a) loading a tray with a plurality of digital camera modules,
   b) moving said tray near a robot of a handler,
   c) loading a first module of said plurality of modules into a first test station, then
   d) starting focus and test routines on said first module, then
   e) loading a second module of said plurality of modules into a second test station, then
   f) ending said focus and test routines on said first module, then
   g) starting said focus and test routines on said second module, then
   h) unloading said first module from said first station and loading said first test station with a third module of said plurality of modules, then
   i) ending said focus and test routines on said second module and starting said focus and test routines on said third module, then
   i) continuing an overlapped load and test of said plurality of modules until said plurality of modules on said tray are focused and tested, then
   j) generating a test map of said plurality of modules, then
   k) moving said tray to a "tray out" area of said handler,
   l) fixing said focus of said modules having a manual focus,
   m) sorting said modules into part number bins.

26. The method of claim 25, wherein loading said tray places said modules in designated locations on said tray aligned with alignment pins.

27. The method of claim 25, wherein moving said tray near said robot uses a conveyor apparatus to position said tray at an alignment mark.

28. The method of claim 25, wherein loading said first module into said first test station uses said robot to select said first module with a vacuum unit, whereby said first module is oriented into a test fixture of the first test station, clamped in the test fixture and electrical contact made to electrical leads of said first module.

29. The method of claim 25, wherein loading a second module into a second test station uses said robot to position the second module during focus and testing of said first module, which buries a loading time of said second module within a focus and test time of said first module.

30. The method of claim 25, wherein unloading said first module from the test fixture uses said robot to select said first module with a vacuum unit and orient said first module onto said tray in a position and orientation originally occupied by said first module.

31. The method of claim 25, wherein moving said tray to said "tray out" area uses a conveyor apparatus.

32. The method of claim 25, wherein fixing said focus on said module having said manual focus permanently connects a lens cap to a body of said module.

33. The method of claim 32, wherein permanently connecting said cap to said body uses glue.

34. The method of claim 32, wherein permanently connecting said cap to said body uses a laser to weld the cap to the body.

35. The method of claim 32, wherein permanently connecting said cap to said body uses a pin to prevent turning of said lens cap.

36. The method of claim 25, wherein sorting said modules into part numbers bins uses said test map to determine which part number bin said module is to be placed.

37. A method of transporting miniature digital camera modules, comprising:
   a) carrying untested digital camera modules to a test handler in a carrying tray,
   b) transferring said untested modules to a handler tray,
   c) transporting said handler tray populated with untested modules to an alignment mark near a robot within said test handler using a conveyor,
   d) selecting untested modules from said handler tray using said robot,
   e) returning tested modules to said handler tray using said robot,
   d) transporting said handler tray with tested modules to a lens fixing and binning area,
   e) transferring said tested modules that are sorted to said carrying trays in said binning area.

38. The method of claim 37, wherein said carrying tray approximately positions said untested modules.

39. The method of claim 38, wherein said carrying tray is plastic with loose tolerances.

40. The method of claim 37, wherein said handler tray accurately positions said modules for selection by said robot.

41. The method of claim 40, wherein said handler tray is metal with tight tolerances.

42. A handler for testing miniature digital camera modules, comprising:
   a) a carrying tray
   b) a handler tray,
   c) a tray in area,
   d) a conveyor,
   e) an alignment mark,
   f) a tray out area,
   g) a lens fixing area,
   h) a binning area, i) said carrying tray transports untested digital camera modules to a test handler from where said untested modules are transferred to said handler tray, j) said conveyer transports said handler tray from said tray in area to said alignment mark, k) said conveyer transports said handler tray containing tested digital camera modules from said alignment mark to said tray out area, and wherefrom said lens are fixed and said modules are sorted into said carrying tray in said binning area.

43. The test handler of claim 42, wherein said handler tray accurately positions said untested modules for selection and orientation into a test fixture by a robot.

44. The test handler of claim 43, wherein said handler tray is metal.

45. The test handler of claim 43, wherein said handler tray contains alignment pins to accurately maintain position of said untested modules.

46. The test handler of claim 42, wherein said carrying tray maintains approximate location of said untested modules.

47. The test handler of claim 46, wherein said carrying tray is plastic.

48. The test handler of claim 42, wherein said lens fixing area permanently fixes a lens cap to a body of said tested modules.

49. The test handler of claim 42, wherein said handler tray reloaded with said plurality of tested modules is unloaded according to test results into said carrying tray located in said binning area.

* * * * *